Nov. 13, 1945.    C. O. GUSS ET AL    2,388,685
FLEXIBLE POLYMERIC PRODUCTS AND METHOD OF MAKING SAME
Filed May 13, 1942
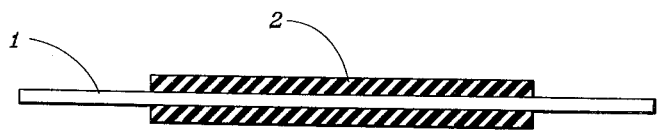
INVENTORS
Cyrus O. Guss
BY  Roger W. Amidon
Griswold & Burdick
ATTORNEYS Patented Nov. 13, 1945

2,388,685

UNITED STATES PATENT OFFICE 2,388,685

FLEXIBLE POLYMERIC PRODUCT AND METHOD OF MAKING SAME

Cyrus O. Guss and Roger W. Amidon, Midland, Mich., assignors to The Dow Chemical Company, Midland, Mich., a corporation of Michigan Application May 13, 1942, Serial No. 442,854

18 Claims. (Cl. 260—86.5)

This invention concerns certain new flexible thermoplastic polymeric products having excellent dielectric properties and also having the unusual property of remaining flexible when cooled to low temperatures, e. g. —50° C. or lower. It also concerns a method whereby such products may be prepared from liquid polymerizable vinyl aromatic compounds and conjugated diolefines.

We have found that the new products having such exceptional flexibility at low temperatures may be prepared by polymerizing a vinyl aromatic compound in aqueous emulsion until the polymerization is substantially complete, e. g. until at least 90 per cent and preferably 98 per cent or more of the vinyl aromatic compound is polymerized, adding to the resultant colloidal solution a conjugated diolefine and polymerizing the latter while in the emulsion. Because of its excellent dielectric properties, its unusual flexibility at low temperatures, and the ease with which it may be molded at elevated temperatures into articles of desired size and shape or may be extruded into rods or tubes, etc., of substantially uniform cross-section and having smooth, even surfaces, the product is well suited for use as an electric insulating material. It is particularly useful as a material for covering and insulating electric wires which may be subjected to vibration or bending while at low temperatures.

We are aware that vinyl aromatic compounds and conjugated diolefines have heretofore been co-polymerized, e. g. by mixing the monomers and heating the mixture, to obtain rubber-like products, and such rubber-like co-polymeric products should not be confused with the products of the present invention. The flexible products provided by this invention, although having somewhat of a rubbery appearance, do not possess the resilience, elasticity or softness of natural rubber, or of such rubber-like co-polymers of the vinyl aromatic compounds and diolefines, and would not ordinarily be thought of as being "synthetic rubber." Also, we have prepared such usual rubber-like co-polymers of styrene and butadiene and have found their properties to be markedly different from those of the products of this invention which had been prepared from the same starting materials in the same proportions. As hereinbefore mentioned, the products of the present invention could be extruded without difficulty to obtain smooth-surfaced rods of uniform diameter. However, the corresponding usual rubber-like co-polymeric products, when extruded in like manner, produced rods of nonuniform diameter having rough and uneven surfaces. Also, whereas a polymeric product of this invention was found to be flexible at —70° C., the corresponding usual rubber-like co-polymer of styrene and butadiene in the same proportions became brittle so that it would break when bent while cooled to only 0° C.

Neither should the products of this invention be confused with products heretofore prepared by separately polymerizing a vinyl aromatic compound and a conjugated diolefine and thereafter intimately mixing the polymers. Such intimate mixtures of the individual polymers do not extrude as readily to form smooth-surfaced rods as do the corresponding products of this invention. Also, the products prepared by intimately mixing the individual polymers have a far greater tendency to crack at the surface when flexed than do the corresponding products of the present invention. Furthermore an intimate mixture of the individual polymers, such as is obtained by separately polymerizing styrene and butadiene in different aqueous emulsions and mixing the resultant colloidal solutions of the individual polymers, when examined under the electron microscope is found to be a heterogeneous mixture of different kinds of particles. When the corresponding products of the present invention are similarly examined, the particles thereof appear to be of only one kind, although of differing sizes and shapes, indicating that the products are of substantially homogeneous composition.

As hereinbefore mentioned, the products with which this invention is concerned are prepared by polymerizing a vinyl aromatic compound while in aqueous emulsion and, after this polymerization is substantially complete, adding a conjugated diolefine and polymerizing the latter while in the emulsion. It is important that the polymerization be carried out in the order just stated, i. e. that the vinyl aromatic compound be polymerized prior to polymerizing the diolefine, since the products of this invention are not obtained when the order in which the polymerizations are carried out is reversed. Peculiarly, the polymerization of a conjugated diolefine while in an aqueous emulsion containing the previously polymerized vinyl aromatic compound occurs far more rapidly than does the polymerization of the diolefine in the absence of the polymerized vinyl aromatic compound under otherwise similar conditions.

As the vinyl aromatic compound to be employed in preparing the new products, styrene is preferred, but other vinyl aromatic compounds such as ortho-methyl-styrene, paramethyl-styrene, ortho-ethyl-styrene, meta-ethyl-styrene, para-ethyl-styrene, para-isopropyl-styrene, ortho-chloro-styrene, or para-chloro-styrene, etc., may be used. Examples of conjugated diolefines which may be employed in the process are butadiene-1.3, isoprene, 2.3-dimethyl-butadiene-1.3, or 2-ethyl-butadiene-1.3, etc. Butadiene-1.3, elsewhere referred to herein as "butadiene," is more readily available than the other diolefines and is preferred. The diolefine and the vinyl aromatic compound are usually employed in molecular proportions corresponding to between 2.3 and 3.5, and preferably between 2.7 and 3.1, moles of the diolefine per mole of the vinyl aromatic compound, but they may be used in other proportions. When employing butadiene and styrene as starting materials, the molecular proportions just stated correspond to between 1.2 and 1.8, and preferably between 1.4 and 1.6, parts by weight of butadiene per part of styrene.

The initial emulsion of the vinyl aromatic compound may be neutral, acidic, or alkaline and may include any of the usual emulsifying agents such as the sulphuric acid esters of lauryl, myristic or other higher aliphatic alcohols, or the alkali salts of such sulphuric acid monoesters, or alkali metal sulphonates of aliphatic or alkyl-aromatic hydrocarbons of high molecular weight, etc. It preferably includes a small amount of a peroxygen compound, e. g. hydrogen peroxide, benzoyl peroxide, sodium perborate, or an ammonium or alkali metal persulphate, etc., as a polymerization catalyst, but such catalyst may in some instances be omitted. The ingredients just mentioned may be used in any of the proportions usual and well known for the preparation of such emulsions.

However, the ease and rate with which the polymerization may be carried out may vary considerably with changes in the kinds or proportions of the ingredients, e. g. emulsifying agent or catalyst, used in preparing the emulsion, and the properties, particularly the resistance to bending of the final polymeric product, is determined not only by the kinds and proportions of the reactants used in preparing the same but also to a large extent by the temperature at which the successive polymerizations are carried out. Accordingly, although the polymerizations may successfully be carried out to obtain the desired products using emulsions prepared in any of the above-mentioned usual ways, the initial emulsion of the vinyl aromatic compound may advantageously be prepared as follows.

Styrene or other vinyl aromatic compound is mixed with one or more parts by weight, usually between 2 and 10 parts, of an aqueous solution which contains between 0.05 and 2, preferably about 0.1, per cent by weight of each of the emulsifying agents, Santomerse No. 3 (i. e. an alkali metal salt of dodecyl benzene sulphonate) and Aquarex D (i. e. the monosodium sulphate esters of a mixture of higher alcohols consisting principally of lauryl and myristic alcohols); and between 0.1 and 1, preferably about 0.15, per cent of an ammonium or an alkali metal persulphate as a polymerization catalyst. An alkaline compound, e. g. a hydroxide, carbonate, or bicarbonate of ammonia, sodium, or potassium, and preferably such bicarbonate, is advantageously added in amount sufficient to render the mixture alkaline, e. g. of pH value between 7 and 10, but the alkaline agent is not required. Polymerizations using the other ingredients just mentioned have been carried out satisfactorily and at fairly rapid rates under neutral and even under acidic conditions, e. g. in the presence of sufficient added acid to give the entire mixture a pH value of only two. It will be understood, of course, that the order in which the various ingredients are admixed with one another is of secondary importance and may be varied.

The mixture is agitated to effect emulsification and is heated in a closed container to temperatures above 50° C., and preferably between 75° and 100° C. to polymerize the vinyl aromatic compound. When employing the preferred reaction conditions just stated, the polymerization is usually complete after from 1 to 2 hours of heating, but longer heating may sometimes be required.

A conjugated diolefine, e. g. butadiene, is added, usually under pressure, in amount corresponding to between 2.3 and 3.5, and preferably between 2.7 and 3.1, times the molecular equivalent of the liquid vinyl aromatic compound initially employed and the mixture is again agitated to effect emulsification. It may be mentioned that the diolefine may, but need not, be added immediately after completing polymerization of the vinyl aromatic compound; i. e. if desired the colloidal solution of the polymerized vinyl aromatic compound may be stored in a closed container for some time, e. g. a week or longer, before adding the diolefine. However, the colloidal solution of the polymerized vinyl aromatic compound is preferably protected against exposure, especially prolonged exposure, to air prior to and during addition of the diolefine, since an absorption of a considerable amount of air in the solution may impair the quality of the final polymeric product.

After adding and emulsifying the diolefine, the mixture is again heated in a closed container at temperatures above 50° C., and preferably between 75° and 100° C. to polymerize the diolefine. When operating under the preferred conditions hereinbefore stated, from 4 to 6 hours of heating usually suffices to effect nearly complete polymerization of the diolefine, but longer heating may sometimes be required.

After completing the polymerizations the reactor is opened and a small portion, e. g. from 0.5 to 5, and usually about 1 per cent by weight, of any of the usual anti-oxidants for rubber, such as phenyl-beta-naphthylamine, di-(p-hydroxyphenyl) cyclohexane, Antox (i. e. a condensation product of aniline and butyraldehyde), or Thermoflex (i. e. p.p'-dimethoxy-diphenylamine), etc., is preferably added to the colloidal solution to stabilize the polymeric product against the action of air. It may be mentioned that in some instances the anti-oxidant may be added prior to or during either of the polymerizations, but in most instances the anti-oxidants tend to inhibit the polymerization reactions so that they are best added after completing the reactions. The product is coagulated in any of the usual ways, e. g. by freezing the colloidal solution thereof or by mixing it with any of a variety of coagulating agents, such as an aqueous solution of hydrochloric or sulphuric acid or an aqueous solution of a salt, such as sodium chloride, sodium sulphate, or calcium chloride, etc. The coagulated product is removed from the mixture, washed with water to free it of adhering mother liquor, and dried. It is usually recovered in the form of a powder or as small granules.

The product thus obtained may be molded or extruded at elevated temperatures, e. g. between 150° and 225° C., into articles of desired size and shape. The molded or extruded articles are usually fairly hard, e. g. when handled they feel somewhat like a hard rubber, but they may readily be bent or flexed without breaking. As hereinbefore mentioned, they possess the unusual property of being flexible at exceptionally low temperatures, e. g. at —50° C. or lower, and they may in most instances be heated to fairly high temperatures, e. g. 150° C., without suffering distortion or other damage. They also are excellent electric insulating materials. Because of this combination of properties they are well adapted to use as materials for covering and insulating electric wires which may be subjected to vibration or bending while at low temperatures or at alternate low and high temperatures. The accompanying drawing, partly in cross section, illustrates an electric wire 1 which is embedded in a surrounding coating 2 of such product.

The following examples describe certain ways in which the principle of the invention has been applied, but are not to be construed as limiting the invention.

Example 1

A Pfaudler reactor of 5 gallons capacity was charged with 1.25 kilograms of styrene and with an aqueous solution of 3.0 grams of Santomerse No. 3 (i. e. an alkali metal salt of dodecyl benzene sulphonate), 3.0 grams of Aquarex D (i. e. monosodium sulphate esters of higher alcohols consisting principally of lauryl and myristic alcohols), 6.0 grams of potassium persulphate, and 6.0 grams of sodium bicarbonate in 5.678 liters of water. The reactor was closed and heated, while rotating the same, at temperatures between 86° and 89° C. for 2 hours. It was then cooled to 40°–50° C. and 1250 grams of butadiene was introduced under sufficient pressure to liquefy the same. The reactor was again closed, rotated and heated to 85° to 90° C. The maximum vapor pressure of the charge was 174 pounds per square inch, but the pressure gradually became less due to polymerization of the butadiene and after 4 hours of heating at 85°–90° C. was only 40 pounds per square inch. The reactor was then cooled, opened, and 25 grams of phenyl-beta-naphthylamine was added to the mixture. The polymer product was coagulated by mixing the colloidal solution with 18.7 kilograms of an aqueous sodium chloride solution of 3 per cent concentration and stirring the mixture. The product was filtered from the liquor and washed with water until the washings were free of chloride ions. The product was then air-dried at 70° C. The dried product, which was in the form of a powder, weighed 2285 grams. It was extruded under pressure at a temperature of about 200° C. into rods of about 0.25 inch diameter. The rods resembled hard rubber in hardness and were fairly stiff, but could be flexed repeatedly or could be bent double without breaking or cracking. They were nearly as flexible at —70° C. as at room temperature. When heated to 150° C. they were somewhat softened, but were not distorted or damaged.

Example 2

The procedure of Example 1 was repeated, except that 1.5 parts by weight of butadiene was employed per part of styrene so that the final product contained approximately 40 per cent by weight of styrene and 60 per cent of butadiene in polymerized form. Rods extruded from this product were somewhat softer and more pliable than those described in Example 1. The product was nearly as flexible at —70° C. as at room temperature.

The new polymeric products provided by the invention may be reacted with sulphur or other usual vulcanizing agents for rubber, if desired. Also they may if desired be admixed with coloring agents, e. g. dyes or pigments, plasticizing agents, or fillers, or they may be admixed with other plastic organic products such as a natural or synthetic rubber, or with other thermoplastic resins to obtain products having special combinations of physical and/or chemical properties.

Other modes of applying the principle of the invention may be employed instead of those explained, change being made as regards the method or products herein disclosed, provided the steps or compounds stated by any of the following claims or the equivalent of such stated steps or compounds be employed.

We therefore particularly point out and distinctly claim as our invention:

1. The method which comprises forming an aqueous emulsion of a monovinyl aromatic compound having the vinyl group attached to a carbon atom of the aromatic nucleus, polymerizing the vinyl aromatic compound at a temperature above 50° C. while in the emulsion, thereafter adding to the emulsion of the polymerized vinyl aromatic compound, the latter being in a form containing less than 10 per cent of the corresponding monomer, an aliphatic conjugated diolefine and polymerizing the latter at a temperature above 50° C. while dispersed in the emulsion together with the polymerized vinyl aromatic compound, the aliphatic conjugated diolefine being added and polymerized in a proportion sufficient to form, together with the polymerized vinyl aromatic compound, a mixed polymeric product which, when separated from the emulsion, is readily extrudable to form a smooth-surfaced rod of substantially uniform cross section, which rod, when of 0.25 inch diameter, is flexible at temperatures as low as —50° C.

2. The method which comprises polymerizing a monovinyl aromatic compound, having the vinyl group attached to a carbon atom of the aromatic nucleus, by heating an aqueous emulsion of the vinyl aromatic compound in a closed container at a temperature above 50° C. until more than 90 per cent of the vinyl aromatic compound initially employed is polymerized, thereafter, while avoiding extensive exposure of the emulsion to air, adding an aliphatic conjugated diolefine and dispersing the latter in the emulsion, and polymerizing the aliphatic conjugated diolefine at a temperature above 50° C. while dispersed in the emulsion together with the polymerized vinyl aromatic compound, the aliphatic conjugated diolefine being added and polymerized in a proportion sufficient to form, together with the polymerized vinyl aromatic compound, a mixed polymeric product which, when separated from the emulsion, is readily extrudable to form a smooth-surfaced rod of substantially uniform cross section, which rod, when of 0.25 inch diameter, is flexible at temperatures as low as —50° C.

3. The method which comprises polymerizing styrene by heating an aqueous emulsion thereof at a temperature above 50° C., thereafter adding to the emulsion of polystyrene, the latter being in a form containing less than 10 per cent of monomeric styrene, an aliphatic conjugated diolefine and polymerizing the latter at a temperature above 50° C. while dispersed in the emulsion together with the polystyrene, the aliphatic conjugated diolefine being added and polymerized in a proportion sufficient to form, together with the polystyrene, a mixed polymeric product which, when separated from the emulsion, is readily extrudable to form a smooth-surfaced rod of substantially uniform cross section which rod, when of 0.25 inch diameter, is flexible at temperatures as low as −50° C.

4. A method for making a solid thermoplastic polymeric product that is flexible at temperatures as low as −50° C. which comprises polymerizing a monovinyl aromatic compound, having the vinyl group attached to a carbon atom of the aromatic nucleus, by heating an aqueous emulsion thereof in a closed container at a temperature above 75° C. until more than 90 per cent of the monovinyl aromatic compound initially employed has been polymerized, adding between 2.3 and 3.5 molecular equivalents of an aliphatic conjugated diolefine per mole of the monovinyl aromatic compound initially employed, and polymerizing the diolefine while in the emulsion at a temperature above 75° C.

5. A method for making a solid thermoplastic product that is flexible at temperatures as low as −50° C., which comprises polymerizing a monovinyl aromatic compound, having the vinyl group attached to a carbon atom of the aromatic nucleus, by heating an aqueous emulsion thereof in a closed container at temperatures between about 75° and about 100° C. until more than 90 per cent of the monovinyl aromatic compound initially employed has been polymerized, adding between 2.7 and 3.1 molecular equivalents of an aliphatic conjugated diolefine per mole of the monovinyl aromatic compound initially employed, polymerizing the diolefine by heating the resultant aqueous emulsion thereof in a closed container at temperatures between about 75° and about 100° C., adding to the mixture a small portion of an anti-oxidant and coagulating and separating the polymeric product from the mixture.

6. A method for making a solid thermoplastic polymeric product that is flexible at temperatures as low as −50° C., which comprises emulsifying a monovinyl aromatic compound by agitating the same with an aqueous solution which contains between 0.05 and 2 per cent by weight of an alkali metal salt of dodecyl benzene sulphonate, between 0.05 and 2 per cent of mono-sodium sulphate esters of higher alcohols consisting principally of lauryl and myristic alcohols, between 0.1 and 1 per cent by weight of an alkali persulphate and sufficient alkali to give the emulsion a pH value between 7 and 10, heating the emulsion in a closed container at temperatures between about 75° and about 100° C. until more than 90 per cent of the monovinyl aromatic compound has been polymerized, thereafter adding between 2.7 and 3.1 molecular equivalents of an aliphatic conjugated diolefine per mole of the monovinyl aromatic compound initially employed, polymerizing the conjugated diolefine by heating the resultant emulsion thereof in a closed container at temperatures between about 75° and about 100° C., adding to the resultant colloidal solution of the polymeric product a small portion of an anti-oxidant, and recovering the polymeric product from the colloidal solution.

7. A method for making a solid thermoplastic polymeric product that is flexible at temperatures as low as −50° C., which comprises polymerizing styrene by heating an aqueous emulsion thereof at temperatures above 50° C. and, while avoiding extensive exposure of the emulsified polystyrene to air, adding to the emulsion of polystyrene, in a form containing less than 10 per cent styrene based on the combined weight of the polystyrene and styrene, between 2.3 and 3.5 molecular equivalents of butadiene-1.3 per mole of the styrene initially employed and polymerizing the butadiene while in dispersion together with the polystyrene at temperatures above 50° C.

8. A method for making a solid thermoplastic polymeric product that is flexible at temperatures as low as −50° C., which comprises polymerizing styrene by heating an aqueous emulsion thereof in a closed container at temperatures above 75° C. until more than 90 per cent of the styrene has been polymerized, adding between 2.3 and 3.5 molecular equivalents of butadiene-1.3 per mole of the styrene initially employed, and polymerizing the butadiene-1.3 while in the emulsion at temperatures above 75° C.

9. A method for making a solid thermoplastic polymeric product that is flexible at temperatures as low as −50° C., which comprises polymerizing styrene by heating an aqueous emulsion thereof in a closed container at temperatures between about 75° and about 100° C. until more than 90 per cent of the styrene has been polymerized, adding between 2.7 and 3.1 molecular equivalents of butadiene-1.3 per mole of the styrene initially employed, polymerizing the butadiene-1.3 by heating the resultant emulsion thereof in a closed container at temperatures between about 75° and about 100° C., thereafter adding to the resultant colloidal solution of the polymeric product a small portion of an anti-oxidant, and recovering the polymeric product from the colloidal solution.

10. A method for making a solid thermoplastic polymeric product that is flexible at temperatures as low as −50° C., which comprises emulsifying styrene by agitating the same with an aqueous solution which contains between 0.05 and 2 per cent by weight of an alkali metal salt of dodecyl benzene sulphonate, between 0.05 and 2 per cent of mono-sodium sulphate esters of higher alcohols consisting principally of lauryl and myristic alcohols, between 0.1 and 1 per cent of an alkali persulphate, and sufficient alkali to give the emulsion a pH value between 7 and 10, heating the emulsion in a closed container at temperatures between about 75° and about 100° C. until more than 90 per cent of the styrene has been polymerized, adding between 2.7 and 3.1 molecular equivalents of butadiene-1.3 per mole of the styrene initially employed, polymerizing the butadiene-1.3 by heating the resultant emulsion thereof in a closed container at temperatures between about 75° and about 100° C., adding to the resultant colloidal solutions of the polymeric product a small portion of an anti-oxidant, coagulating the product and separating it from the mixture.

11. A solid thermoplastic polymeric product which, when in the form of an extruded rod of 0.25 inch diameter, is flexible at temperatures as low as −50° C. and which solid thermoplastic polymeric product is prepared by polymerizing a monovinyl aromatic compound, having the vinyl group attached to a carbon atom of the aromatic nucleus, at a temperature above 50° C. while in aqueous emulsion, thereafter adding to the aqueous emulsion of the polymerized vinyl aromatic compound, the latter being in a form containing less than 10 per cent of the corresponding monomer, an aliphatic conjugated diolefine and polymerizing the latter at a temperature above 50°

C. while in the emulsion, the diolefine being added and polymerized in amount sufficient to render the mixed polymeric product, when separated from the emulsion, readily extrudable to form a smooth-surfaced rod of substantially uniform cross section and having the above-stated flexibility chaarcteristics.

12. A solid thermoplastic polymeric product which is flexible at temperatures as low as −50° C. and which is obtained by polymerizing a monovinyl aromatic compound, having the vinyl group attached to a carbon atom of the aromatic nucleus, in aqueous emulsion at a temperature above 50° C. to obtain a colloidal solution of the polymer, which solution contains less than 10% of the monomeric vinyl aromatic compound based on the combined weight of the same and said polymer, thereafter adding between 2.3 and 3.5 molecular equivalents of an aliphatic conjugated diolefine per mole of the monovinyl aromatic compound initially employed, and polymerizing the diolefine at a temperature above 50° C. while in said emulsion.

13. A solid thermoplastic product which, when in the form of an extruded rod of 0.25 inch diameter, is flexible at temperatures as low as −50° C. and which solid thermoplastic product is prepared by polymerizing styrene at a temperature above 50° C. while in aqueous emulsion, thereafter adding to the aqueous emulsion of polystyrene, the polystyrene being in a form containing less than 10 per cent of monomeric styrene, butadiene-1.3 and polymerizing the latter at a temperature above 50° C. while in the emulsion, the butadiene-1.3 being added and polymerized in amount sufficient to render the mixed polymeric product, when separated from the emulsion, readily extrudable to form a smooth-surfaced rod of substantially uniform cross section and having the above-stated flexibility characteristics.

14. A solid thermoplastic polymeric product which is flexible at temperatures as low as −50° C. and which is prepared by polymerizing styrene at a temperature above 50° C. while in aqueous emulsion to obtain an aqueous dispersion of polystyrene containing less than 10% of monomeric styrene based on the weight of the polystyrene, thereafter adding between 2.3 and 3.5 molecular equivalents of butadiene-1.3 per mole of the styrene initially employed, and polymerizing the butadiene-1.3 at a temperature above 50° C. while in the colloidal solution.

15. A solid thermoplastic polymeric product which is flexible at temperatures as low as −50° C. and which is prepared by polymerizing styrene while in aqueous emulsion at temperatures between about 75° and about 100° C. until at least 90% of the styrene present in the emulsion is in polymerized form, thereafter adding between 2.7 and 3.1 molecular equivalents of butadiene-1.3 per mole of the styrene initially employed, polymerizing the butadiene-1.3 by heating the resultant emulsion thereof in a closed container at temperatures between about 75° and about 100° C., and treating the resultant colloidal solution of the polymeric product with a small portion of an anti-oxidant, and thereafter coagulating the polymeric product.

16. An electric conductor coated with the product claimed in claim 13.

17. An electric conductor coated with the product claimed in claim 12.

18. An electric conductor coated with the product claimed in claim 14.

CYRUS O. GUSS.
ROGER W. AMIDON.